(12) United States Patent
Meng et al.

(10) Patent No.: US 11,126,279 B2
(45) Date of Patent: Sep. 21, 2021

(54) STYLUS PEN, TOUCH PANEL, TOUCH SENSING SYSTEM AND OPERATING METHOD THEREOF

(71) Applicants: Beijing BOE Optoelectronics Technology Co., Ltd., Beijing (CN); BOE TECHNOLOGY GROUP CO., LTD., Beijing (CN)

(72) Inventors: Zhaohui Meng, Beijing (CN); Wei Sun, Beijing (CN); Wenchao Han, Beijing (CN); Xinle Wang, Beijing (CN); Yilin Feng, Beijing (CN); Guangquan Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/597,900

(22) Filed: Oct. 10, 2019

(65) Prior Publication Data

US 2020/0125188 A1  Apr. 23, 2020

(30) Foreign Application Priority Data

Oct. 17, 2018  (CN) .......................... 201811208880.6

(51) Int. Cl.
*G06F 3/0354* (2013.01)
*G06F 3/038* (2013.01)
(Continued)

(52) U.S. Cl.
CPC ........ *G06F 3/03545* (2013.01); *G06F 3/0383* (2013.01); *G06F 3/0442* (2019.05); *G06F 3/04162* (2019.05); *G06F 3/04164* (2019.05)

(58) Field of Classification Search
CPC ............... G06F 3/03545; G06F 3/0442; G06F 3/04164; G06F 3/04162; G06F 3/0383;
(Continued)

(56) References Cited

U.S. PATENT DOCUMENTS 9,830,000 B2 * 11/2017 Westhues .............. G06F 3/0442
9,939,975 B2 *  4/2018 Ye ........................ G06F 3/03545
(Continued)

FOREIGN PATENT DOCUMENTS

CN  105094380  11/2015
CN  105511648  4/2016
(Continued)

OTHER PUBLICATIONS

Office action from Chinese Application No. 201811208880.6 dated Jun. 22, 2021.

*Primary Examiner* — Bryan Earles
(74) *Attorney, Agent, or Firm* — Calfee, Halter & Griswold LLP (57) ABSTRACT

A stylus pen that includes a tip electrode, a power supply circuit, a signal detector, and a drive circuit where an output signal is transmitted to and an input signal is received from a touch panel via the tip electrode. The power supply circuit of the stylus pen selectively supplies a first supply voltage or a second supply voltage. The signal detector of the stylus pen detects an enable signal from the input signal and the signal detector of the stylus pen controls the power supply circuit to supply the first supply voltage in response to presence of the enable signal. The drive circuit operates at the first supply voltage to generate the output signal.

15 Claims, 7 Drawing Sheets

(51) Int. Cl.
*G06F 3/044* (2006.01)
*G06F 3/041* (2006.01)

(58) Field of Classification Search
CPC ... G06F 3/0414; G06F 3/0416; G06F 3/04883
See application file for complete search history.

(56) References Cited

U.S. PATENT DOCUMENTS

| | | | |
|---|---|---|---|
| 10,042,477 B2 * | 8/2018 | King-Smith | G06F 3/0416 |
| 10,126,874 B2 * | 11/2018 | Hargreaves | G06F 3/0445 |
| 10,558,352 B2 * | 2/2020 | Yamano | G06F 3/0485 |
| 2012/0256830 A1 * | 10/2012 | Oda | G06F 3/041 |
| | | | 345/157 |
| 2015/0338930 A1 | 11/2015 | Hara | |
| 2016/0306448 A1 * | 10/2016 | Fleck | G06F 3/0446 |
| 2017/0060278 A1 | 3/2017 | Jung et al. | |
| 2017/0192534 A1 * | 7/2017 | Han | G06F 3/0383 |
| 2017/0192549 A1 * | 7/2017 | Katayama | G06F 3/033 |
| 2017/0285772 A1 * | 10/2017 | Yamamoto | G06F 3/0416 |
| 2018/0046272 A1 * | 2/2018 | Hara | G06F 3/03545 |
| 2018/0113559 A1 * | 4/2018 | Bae | G06F 3/04162 |
| 2018/0239449 A1 * | 8/2018 | Lin | G06F 3/0416 |

FOREIGN PATENT DOCUMENTS

| | | |
|---|---|---|
| CN | 106484178 | 3/2017 |
| CN | 107066122 | 8/2017 |
| CN | 107111399 | 8/2017 |
| CN | 107977112 | 5/2018 |
| WO | 2018165944 | 9/2018 |

\* cited by examiner

STYLUS PEN, TOUCH PANEL, TOUCH SENSING SYSTEM AND OPERATING METHOD THEREOF

CROSS-REFERENCE TO RELATED APPLICATIONS

The present application claims priority to Chinese Patent Application No. 201811208880.6, filed on Oct. 17, 2018, the entire disclosure of which is incorporated herein by reference.

TECHNICAL FIELD

The present disclosure relates to the field of touch technologies, and in particular, to a stylus pen, a touch panel, a touch sensing system, and a method of operating the touch sensing system.

BACKGROUND

Currently, commercially available stylus pens are mainly divided into passive stylus pens and active stylus pens. The passive stylus pen does not emit a signal, but instead mimics a touch effect of a finger, in which the capacitance of touch sensors in a touch panel is changed when the pen tip is in contact with a screen of the touch panel. Unlike the passive stylus pen, the active stylus pen acts as a signal source and emits an excitation signal to the touch panel. The touch panel then receives the excitation signal from the active stylus pen and detects from the received excitation signal a position of the pen tip on the screen and other information.

The active stylus pen is commonly powered by a battery. A low power consumption design will therefore be beneficial to improve the endurance of the active stylus pen. Typically, the active stylus pen is provided with a manual switch to switch between an operating mode and a non-operating mode. In addition, the reliability and cost of the active stylus pen is also a factor considered in designing the active stylus pen.

SUMMARY

According to some exemplary embodiments, a stylus pen is provided. The stylus pen comprises: a tip electrode configured to be in contact with a screen of a touch panel to transmit an output signal to the touch panel via the tip electrode and receive an input signal from the touch panel via the tip electrode; a power supply circuit configured to selectively supply a first supply voltage or a second supply voltage; a signal detector configured to detect an enable signal from the input signal, wherein the signal detector is further configured to control the power supply circuit to supply the first supply voltage in response to presence of the enable signal, and to control the power supply circuit to supply the second supply voltage in response to absence of the enable signal for a period of time; and a drive circuit configured to operate at the first supply voltage to generate the output signal and not to generate the output signal at the second supply voltage.

In some exemplary embodiments, the signal detector comprises: a first attenuator configured to attenuate the input signal from the touch panel, and a decoder configured to decode the enable signal from the input signal attenuated by the first attenuator.

In some exemplary embodiments, the decoder is further configured to decode a synchronization signal from the input signal attenuated by the first attenuator. The drive circuit comprises a microcontroller comprising: a built-in clock circuit configured to generate a clock signal, and a processor configured to control the built-in clock circuit based on the synchronization signal to adjust the clock signal to synchronize time between the stylus pen and the touch panel, and to generate the output signal based on the adjusted clock signal.

In some exemplary embodiments, the drive circuit further comprises an amplifier configured to amplify the output signal such that the output signal amplified by the amplifier is transmitted via the tip electrode.

In some exemplary embodiments, the input signal from the touch panel comprises a spread spectrum signal. The signal detector further comprises a despreader configured to despread the input signal attenuated by the first attenuator for decoding by the decoder.

In some exemplary embodiments, the stylus pen further comprises at least one of a pressure sensor or an angle sensor. The pressure sensor is configured to detect a pressing force of the tip electrode being pressed on the screen of the touch panel. The angle sensor is configured to detect a tilt angle of the stylus pen relative to the screen of the touch panel. The drive circuit is further configured to generate the output signal based on at least one of the pressing force or the tilt angle.

According to some exemplary embodiments, a touch panel for use with a stylus pen is provided. The touch panel comprises: a plurality of touch sensors throughout a display area of the touch panel; and a touch driver configured to detect an output signal from the stylus pen via the plurality of touch sensors and transmit an input signal to the stylus pen via the plurality of touch sensors. The input signal comprises an enable signal that enables the stylus pen to generate the output signal.

In some exemplary embodiments, the touch driver comprises: a second attenuator configured to attenuate the output signal from the stylus pen, a signal codec configured to decode the output signal attenuated by the second attenuator, and a touch signal processor configured to generate the input signal and process the output signal decoded by the signal codec to detect a touch event by the stylus pen. The signal codec is further configured to encode the input signal generated by the touch signal processor such that the input signal encoded by the signal codec is transmitted via the plurality of touch sensors.

According to some exemplary embodiments, a touch sensing system comprising a stylus pen and a touch panel is provided. The stylus pen comprises: a tip electrode configured to be in contact with a screen of a touch panel to transmit an output signal to the touch panel via the tip electrode and receive an input signal from the touch panel via the tip electrode; a power supply circuit configured to selectively supply a first supply voltage or a second supply voltage; a signal detector configured to detect an enable signal from the input signal, wherein the signal detector is further configured to control the power supply circuit to supply the first supply voltage in response to presence of the enable signal, and to control the power supply circuit to supply the second supply voltage in response to absence of the enable signal for a period of time; and a drive circuit configured to operate at the first supply voltage to generate the output signal and not to generate the output signal at the second supply voltage. The touch panel comprises: a plurality of touch sensors throughout a display area of the touch panel; and a touch driver configured to detect the output signal from the stylus pen via the plurality of touch sensors and transmit the input signal to the stylus pen via the plurality of touch sensors.

According to some exemplary embodiments, a method of operating the above touch sensing system is provided. The method comprises: transmitting, by the touch panel, the input signal to the stylus pen; detecting, by the signal detector, the enable signal from the input signal; controlling, by the signal detector, the power supply circuit to supply the first supply voltage responsive to presence of the enable signal; and controlling, by the signal detector, the power supply circuit to supply the second supply voltage responsive to absence of the enable signal for a period of time.

In some exemplary embodiments, the drive circuit comprises a microcontroller comprising: a built-in clock circuit configured to generate a clock signal, and a processor. The transmitting the input signal comprises transmitting the enable signal. The method further comprises: transmitting, by the touch panel, a first synchronization signal to the stylus pen immediately after transmitting the enable signal; detecting, by the signal detector, the first synchronization signal from the input signal; and controlling, by the processor, the built-in clock circuit to adjust the clock signal to synchronize time between the stylus pen and the touch panel responsive to the first synchronization signal.

In some exemplary embodiments, the method further comprises: after the transmitting by the touch panel the first synchronization signal, and each time before the stylus pen transmits the output signal: transmitting, by the touch panel, a second synchronization signal to the stylus pen; detecting, by the signal detector, the second synchronization signal from the input signal; and controlling, by the processor, the built-in clock circuit to adjust the clock signal to synchronize time between the stylus pen and the touch panel responsive to the second synchronization signal.

In some exemplary embodiments, the signal detector comprises a first attenuator and a decoder. The detecting, by the signal detector, the enable signal, the first synchronization signal, or the second synchronization signal from the input signal comprises: attenuating, by the first attenuator, the input signal from the touch panel, and decoding, by the decoder, the enable signal, the first synchronization signal, or the second synchronization signal from the input signal attenuated by the first attenuator.

In some exemplary embodiments, the touch driver comprises a signal codec and a touch signal processor. The method further comprises: generating, by the touch signal processor, the input signal, and encoding, by the signal codec, the input signal generated by the touch signal processor such that the encoded input signal is transmitted via the plurality of touch sensors.

In some exemplary embodiments, the encoding the input signal generated by the touch signal processor comprises encoding the input signal into a spread spectrum signal. the signal detector further comprises a despreader. The method further comprises: dispreading, by the despreader, the attenuated input signal for decoding by the decoder.

BRIEF DESCRIPTION OF THE DRAWINGS

Further details, features and advantages of the present disclosure are disclosed in the following description of exemplary embodiments in conjunction with the accompanying drawings, in which.

DETAILED DESCRIPTION

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being"on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. In no event, however, should "on" or "directly on" be construed as requiring a layer to completely cover an underlying layer.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Exemplary embodiments will be described in detail below in conjunction with the accompanying drawings.

Figure 1:
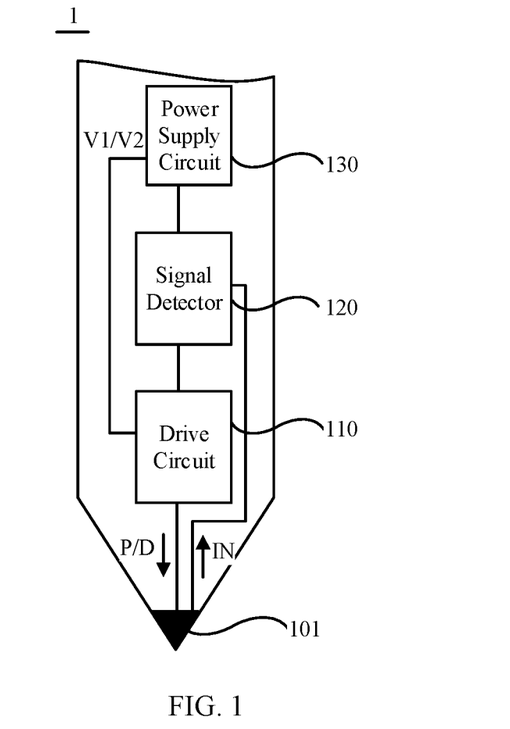
FIG. 1 is a schematic block diagram of a stylus pen according to an exemplary embodiment.

FIG. 1 is a schematic block diagram of a stylus pen 1 according to an exemplary embodiment. As shown in FIG. 1, the stylus pen 1 includes a tip electrode 101, a drive circuit 110, a signal detector 120, and a power supply circuit 130.

When the tip electrode 101 is in contact with a screen of a touch panel (not shown in FIG. 1), the stylus pen 1 can transmit an output signal P/D to the touch panel via the tip electrode 101 and receive an input signal IN from the touch panel via the tip electrode 101. In other words, the stylus pen 1 is in two-way communication with the touch panel. The tip electrode 101 may be made of a suitable conductive material.

Figure 2:
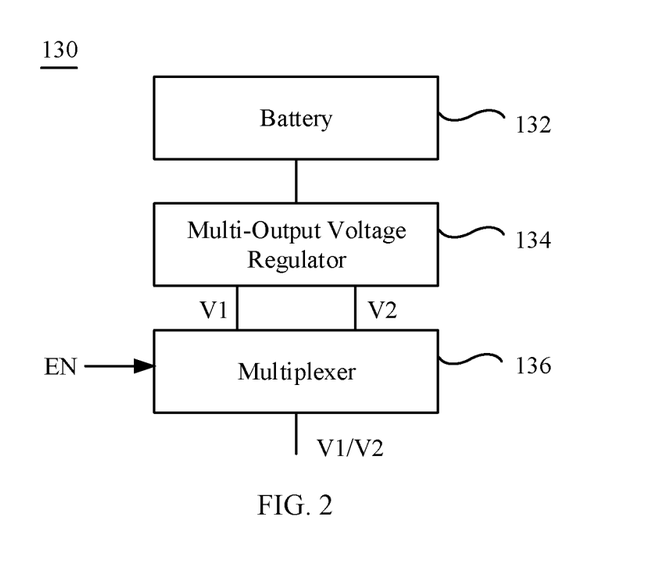
FIG. 2 is a schematic block diagram of a power supply circuit in the stylus pen of FIG. 1.

The power supply circuit 130 selectively supplies a first supply voltage V1 or a second supply voltage V2. FIG. 2 shows an example of the power supply circuit 130. Referring to FIG. 2, in this example, the power supply circuit 130 includes a battery 132 such as a lithium battery, a multi-output voltage regulator 134 that generates from a supply voltage of the battery 132 at least a first supply voltage V1 and a second supply voltage V2, and a multiplexer 136 that selectively outputs the first supply voltage V1 or the second supply voltage V2. It will be understood that the power supply circuit 130 illustrated in FIG. 2 is exemplary and that other embodiments are possible. For example, the battery 132 may be optional, meaning that the stylus pen 1 may not include the battery 132 as a default accessory.

Referring back to FIG. 1, the signal detector 120 detects an enable signal EN from the input signal IN. In response to presence of the enable signal EN, the signal detector 120 controls the power supply circuit 130 to supply the first supply voltage V1. In response to absence of the enable signal EN for a period of time, the signal detector 120 controls the power supply circuit 130 to supply the second supply voltage V2.

The drive circuit 110 operates in an operating mode at the first supply voltage V1 in which the output signal P/D is generated, and operates in a non-operating mode at the second supply voltage V2 in which the output signal P/D is not generated.

Typically, the first supply voltage V1 is greater than the second supply voltage V2. In exemplary embodiments, the output signal P/D may include a voltage signal detectable by the touch panel for determination of a touch location and optionally other information embedded in the voltage signal. This information may be indicative of the thickness, line type, or the like of the handwriting of the stylus pen 1. For example, when using the stylus pen 1 to manipulate a touch panel, a user can provide this information by adjusting a pressing force or a tilt angle of the stylus pen 1, as will be further described later.

This way, the stylus pen 1 selectively operates in the operating mode depending upon whether the enable signal EN is received from the touch panel. This advantageously provides an option for saving the power consumption of the stylus pen 1.

Figure 3:
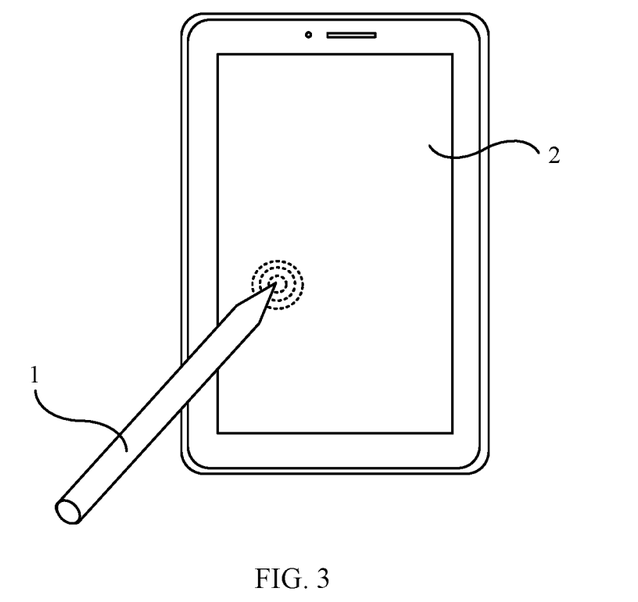
FIG. 3 is a diagram of a touch sensing system according to an exemplary embodiment.

FIG. 3 is a schematic diagram of a touch sensing system according to an embodiment of the present disclosure. The system includes the stylus pen 1 as described above and a touch panel 2.

When a user holding the stylus pen 1 wants to use the stylus pen 1 to manipulate the touch panel 2, he or she places the tip electrode 101 of the stylus pen 1 on the screen surface of the touch panel 2, as shown in FIG. 3. Then, the stylus pen 1 receives the enable signal EN from the touch panel 2, and thus operates in the operating mode. Instead, if the user does not place the tip electrode 101 of the stylus pen 1 on the screen surface of the touch panel 2 within a long period of time, and the stylus pen 1 thus fails to receive the enable signal EN from the touch panel 2 during that period of time, then the stylus pen 1 will enter the non-operating mode.

The touch panel 2 includes a plurality of touch sensors throughout a display area (not shown in FIG. 3) of the touch panel 2. These touch sensors may be constructed differently depending upon sensing mechanisms.

Figure 4A:
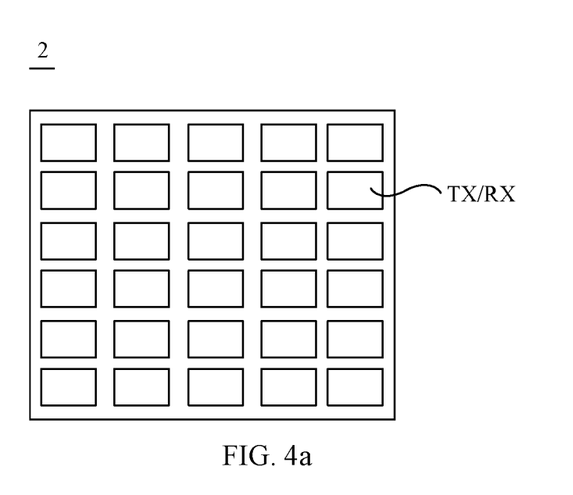
FIG. 4a is a schematic diagram of an example of touch sensors of a touch panel in the system of FIG. 3.

FIG. 4a schematically shows a self-capacitance touch panel as an example of the touch panel 2, which includes a plurality of electrode blocks TX/RX arranged in a matrix. The electrode blocks TX/RX may be made of a transparent conductive material such as indium tin oxide (ITO) or indium zinc oxide (IZO). The respective electrode blocks TX/RX form respective touch sensors.

When the stylus pen 1 is in contact with the screen of the touch panel 2, there is a coupling capacitance between the tip electrode 101 of the stylus pen 1 and a corresponding one(s) of the electrode blocks TX/RX, such that the output signal P/D applied to the tip electrode 101 causes a change in a voltage on the corresponding electrode block(s) TX/RX. The touch panel 2 may determine a touch position of the tip of the stylus pen 1 on the screen by scanning the respective electrode blocks TX/RX. In addition, due to the coupling capacitance, a change in the output signal P/D on the tip electrode 101 causes a corresponding change in the voltage on the corresponding electrode block(s) TX/RX. The touch panel 2 can thus acquire information embedded in the output signal P/D by detecting such a change. On the other hand, when the touch panel 2 applies the input signal IN to the electrode blocks TX/RX, a change in the input signal IN also causes a corresponding change in a voltage on the tip electrode 101. The stylus pen 1 can thus acquire the input signal IN transmitted by the touch panel 2 by detecting such a change.

Figure 4B:
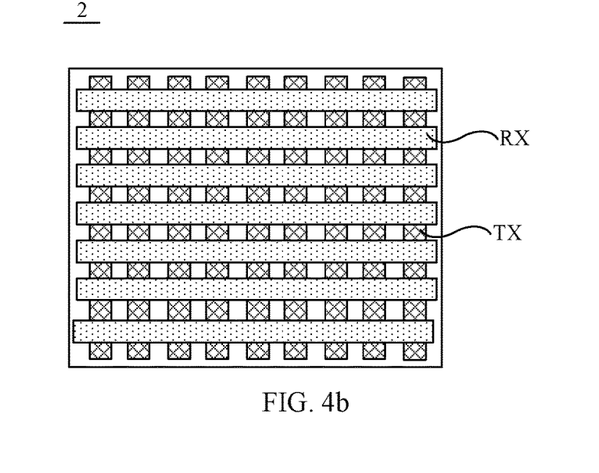
FIG. 4b is a schematic diagram of another example of touch sensors of the touch panel in the system of FIG. 3.

FIG. 4b schematically illustrates a mutual-capacitance touch panel as an example of the touch panel 2, which includes a plurality of driving electrode strips TX extending in a first direction and a plurality of sensing electrode strips RX extending in a second direction crossing the first direction. The driving electrode strips TX and the sensing electrode strips RX may be made of a transparent conductive material such as indium tin oxide (ITO) or indium zinc oxide (IZO). The respective intersections of the driving electrode strips TX and the sensing electrode strips RX form respective touch sensors.

Similar to the example of FIG. 4a, when the stylus pen 1 is in contact with the screen of the touch panel 2, there is a coupling capacitor between the tip electrode 101 of the stylus pen 1 and a corresponding driving electrode strip TX or a corresponding sensing electrode strip RX. The output signal P/D applied to the tip electrode 101 causes a change in a voltage on the corresponding driving electrode strip TX or the corresponding sensing electrode strip RX. The touch panel 2 may determine a touch position of the tip of the stylus pen 1 on the screen by scanning the driving electrode strips TX and the sensing electrode strips RX. In addition, due to the coupling capacitance, a change in the output signal P/D on the tip electrode 101 causes a corresponding change in the voltage on the corresponding driving electrode strip TX or the corresponding sensing electrode strip RX. The touch panel 2 can thus acquire information embedded in the output signal P/D by detecting such a change. On the other hand, when the touch panel 2 applies the input signal IN to the driving electrode strips TX and the sensing electrode strips RX, a change in the input signal IN also causes a corresponding change in a voltage on the tip electrode 101. The stylus pen 1 can thus acquire the input signal IN transmitted by the touch panel 2 by detecting such a change.

Figure 5:
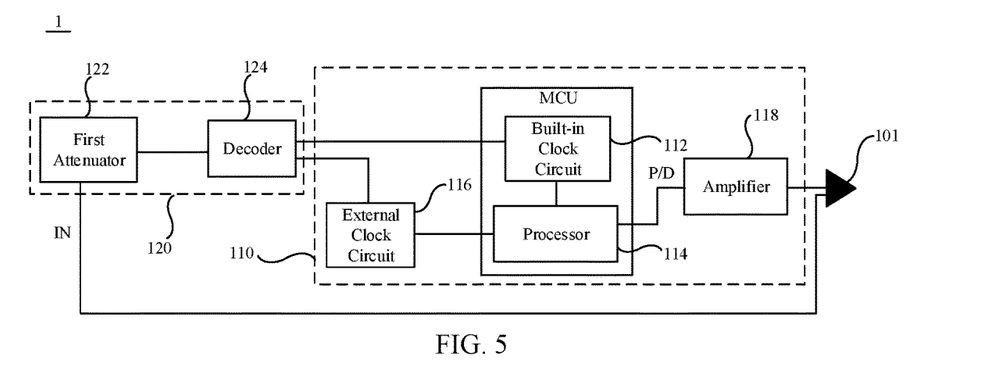
FIG. 5 is a schematic block diagram showing the stylus pen of FIG. 1 in more detail, according to an exemplary embodiment.

FIG. 5 is a schematic block diagram showing the stylus pen 1 of FIG. 1 in more detail, according to an exemplary embodiment. As shown in FIG. 5, the signal detector 120 includes a first attenuator 122 and a decoder 124, and the drive circuit 110 includes a microcontroller (MCU).

The first attenuator 122 attenuates the input signal IN from the touch panel 2. Since the stylus pen 1 and the touch panel 2 communicate with each other by means of a coupling capacitance, the output signal P/D transmitted by the stylus pen 1 and the input signal IN transmitted by the touch panel 2 generally have a high voltage level (e.g., 20 to 30 V) to ensure that the signal is received with a sufficient intensity. The first attenuator 122 is used to attenuate the input signal IN received by the stylus pen 1 from the touch panel 2 so that it can be processed by the decoder 124.

The decoder 124 decodes the enable signal EN from the input signal IN attenuated by the first attenuator 122. The input signal IN from the touch panel 2 was encoded in accordance with a predetermined communication protocol, and the decoder 124 is used to decode the input signal IN.

The MCU includes a built-in clock circuit 112 and a processor 114. The built-in clock circuit 112 generates a clock signal for the MCU. The built-in clock circuit 112 includes, for example, an RC oscillator, a counter, and a holding register. Each oscillation of the RC oscillator decrements the counter by one, and the counter reloads an initial value from the holding register when the counter is decremented to zero. The built-in clock circuit 112 may adjust the generated clock signal by setting the counter and the holding register. Alternatively, the drive circuit 110 may include an external clock circuit 116. The use of the built-in clock circuit 112 can reduce the cost of the stylus pen 1 in that the external clock circuit 116 is not required. However, the clock signal generated by the built-in clock circuit 112 typically has low precision such that it may affect the accuracy of the communication between the stylus pen 1 and the touch panel 2.

For the purpose of improving the clock accuracy of the MCU, in some exemplary embodiments, the input signal IN transmitted by the touch panel 2 further includes a synchronization signal, and the decoder 124 further decode the synchronization signal from the input signal IN attenuated by the first attenuator 122, as will be further described later.

Based on the synchronization signal, the processor 114 controls the built-in clock circuit 112 to adjust the clock signal to synchronize time between the stylus pen 1 and the touch panel 2. Moreover, the processor 114 generates the output signal P/D based on the adjusted clock signal. This can compensate for the low precision of the clock signal due to the use of the built-in clock circuit 112. It will be understood that the microcontroller MCU shown in FIG. 5 is exemplary and that, in other embodiments, the drive circuit 110 may include, but is not limited to, a conventional microprocessor, an application specific integrated circuit (ASIC), and a field programmable gate array (FPGA).

In the example of FIG. 5, the drive circuit 110 further includes an amplifier 118 that amplifies the output signal P/D generated by the processor 114 such that the amplified output signal P/D is transmitted via the tip electrode 101. The amplified output signal P/D has an amplitude of, for example, 20 to 30 V, such that a signal induced on the touch sensors of the touch panel 2 by the coupling capacitance can be detected and recognized.

Figure 6:
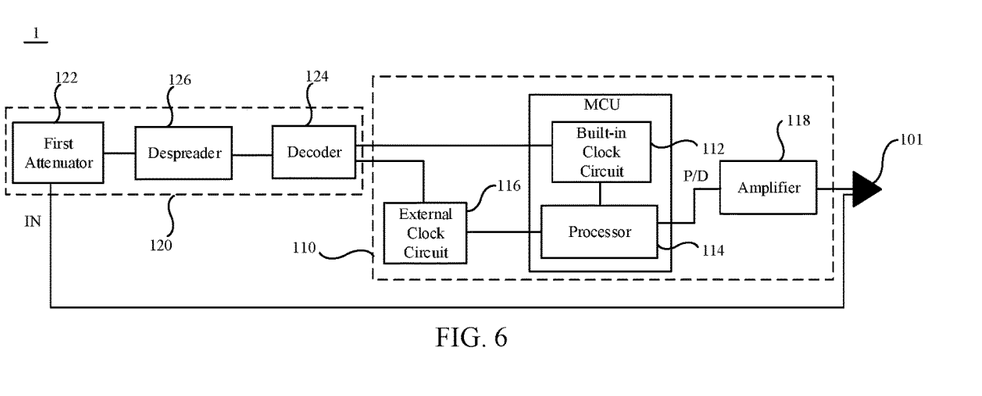
FIG. 6 is a schematic block diagram showing the stylus pen of FIG. 1 in more detail, according to an exemplary embodiment.

FIG. 6 is a schematic block diagram showing another exemplary embodiment of the stylus pen 1. The signal detector 120 further includes a despreader 126 as compared to the embodiment shown in FIG. 5.

In this embodiment, the input signal IN from the touch panel 2 is a spread spectrum signal, such as a direct sequence spread spectrum (DSSS) signal. The DSSS scheme has the advantages of small delay and strong anti-interference ability. The despreader 126 despreads the input signal IN attenuated by the first attenuator 122 to recover the transmitted information for decoding by the decoder 124.

Figure 7:
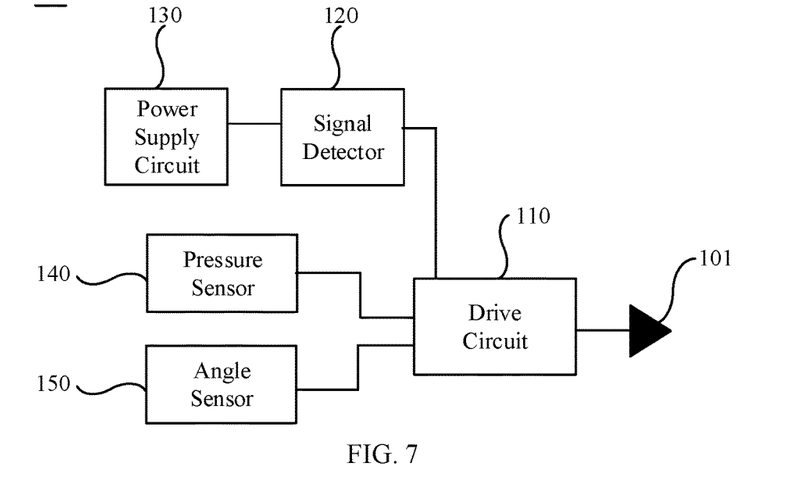
FIG. 7 is a schematic block diagram of a stylus pen according to an exemplary embodiment.

FIG. 7 is a schematic block diagram showing another exemplary embodiment of the stylus pen 1. As shown in FIG. 7, the stylus pen 1 further includes a pressure sensor 140 and an angle sensor 150.

Figure 8:
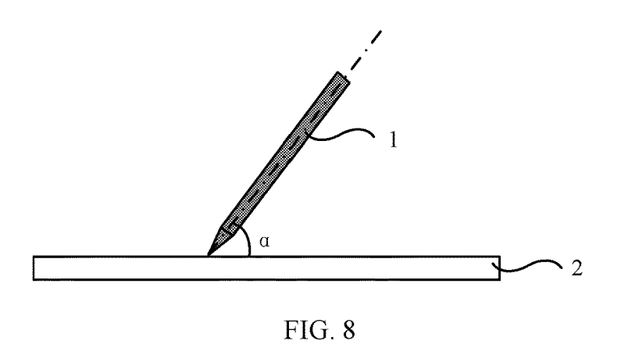
FIG. 8 is a diagram showing the stylus pen of FIG. 7 when in use.

The pressure sensor 140 detects a pressing force of the tip electrode 101 being pressed on the screen of the touch panel 2, and outputs the detection result to the drive circuit 110. The angle sensor 150 detects a tilt angle α of the stylus pen 1 with respect to the screen of the touch panel 2 (as shown in FIG. 8), and outputs the detection result to the drive circuit 110.

The drive circuit 110 generates the output signal P/D based on the pressing force and/or the tilt angle. In this case, the output signal P/D includes information on the pressing force of the pen tip of the stylus pen 1 and/or the tilt angle α of the stylus pen 1, whereby the touch panel 2 can adjust the handwriting of the stylus pen 1 accordingly after receiving the output signal P/D. For example, the greater the pressing force detected by the pressure sensor 140, the thicker the handwriting of the stylus pen 1 displayed by the touch panel 2. For another example, the smaller the tilt angle α of the stylus pen 1 detected by the angle sensor 71, the thicker the handwriting of the stylus pen 1 displayed by the touch panel 2.

It will be understood that in some exemplary embodiments the output signal P/D may further contain other information, such as a user selection of keys on the stylus pen 1 (e.g., a color key, a line type key, etc.).

Figure 9:
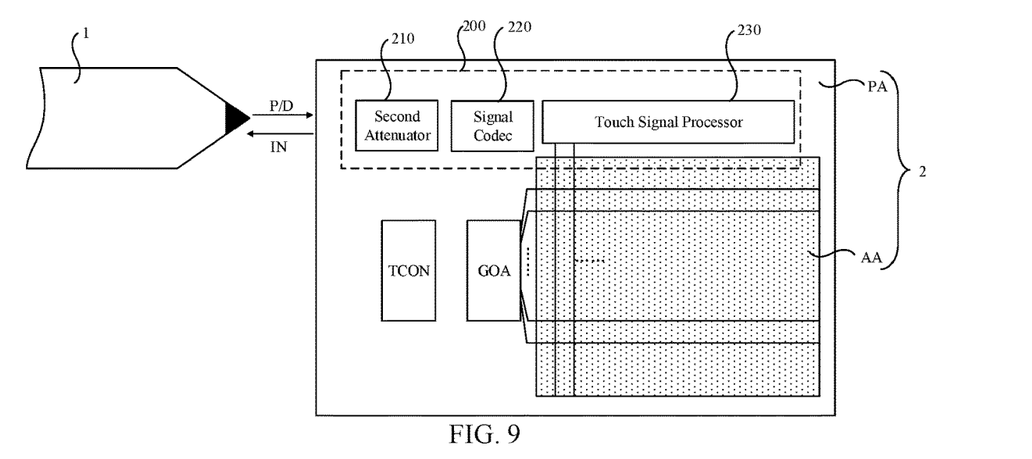
FIG. 9 is a schematic block diagram showing the system of FIG. 3 in more detail, according to an exemplary embodiment.

FIG. 9 is a schematic block diagram showing the touch sensing system of FIG. 3 in more detail. As shown in FIG. 9, the touch panel 2 includes a display area AA and a non-display area PA. The display area AA is provided with a plurality of touch sensors as those shown in FIG. 4a or 4b. The non-display area PA is provided with a timing controller TCON, a gate driver GOA, and a touch driver 200. Other elements may have been omitted in FIG. 9 for convenience of illustration.

The timing controller TCON controls the operation of the gate driver GOA and the touch driver 200 (and potentially other elements). Under the control of timing signals of TCON, the gate driver GOA scans the gate lines in the display area AA line by line.

The touch driver 200 detects the output signal P/D from the stylus pen 1 via the plurality of touch sensors and transmits the input signal IN to the stylus pen 1 via the plurality of touch sensors. In this embodiment, the touch driver 200 includes a second attenuator 210, a signal codec 220, and a touch signal processor 230.

The second attenuator 210 attenuates the output signal P/D from the stylus pen 1. The second attenuator 210 is used to attenuate the output signal P/D received by the touch panel 2 from the stylus pen 1 so that it can be processed by the signal codec 220.

The signal codec 220 decodes the output signal P/D attenuated by the second attenuator 210. The signal codec 220 also encodes the input signal IN generated by the touch signal processor 230 such that the encoded input signal IN is transmitted via the plurality of touch sensors. For example, in an exemplary embodiment where a direct sequence spread spectrum scheme is employed, the input signal IN first enters the signal codec 220 to produce an analog signal of a narrower bandwidth close to a certain central spectrum. Then, the analog signal is modulated with a pseudo-random sequence to obtain a DSSS signal. Examples of the signal codec 220 include, but are not limited to, a conventional microprocessor, an application specific integrated circuit (ASIC), and a field programmable gate array (FPGA).

The touch signal processor 230 generates the input signal IN and processes the output signal P/D decoded by the signal codec 220 to detect a touch event by the stylus pen 1. Examples of the touch signal processor 230 include, but are not limited to, a conventional microprocessor, an application specific integrated circuit (ASIC), and a field programmable gate array (FPGA).

Figure 10:
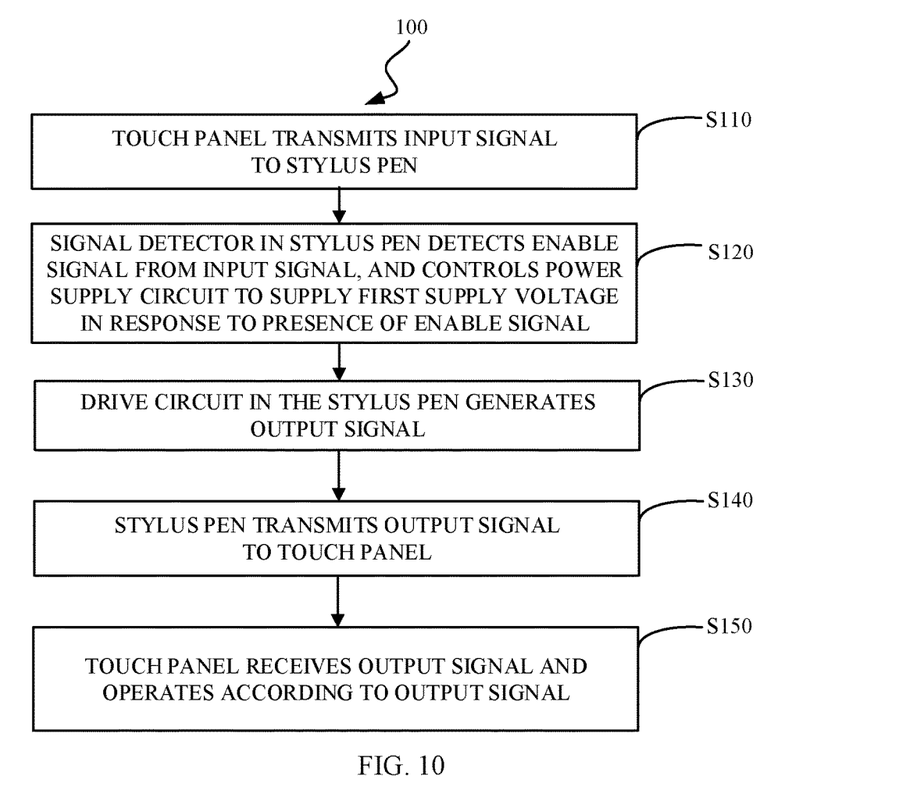
FIG. 10 is a flow chart of a process of operating a touch sensing system according to an exemplary embodiment.

FIG. 10 is a flow chart of a process 100 of operating a touch sensing system according to an exemplary embodiment. The process 100 of FIG. 10 is described below in conjunction with FIGS. 6 and 9.

At step S110, the touch panel 2 transmits the input signal IN to the stylus pen 1.

At step S120, the signal detector 120 in the stylus pen 1 detects the enable signal EN from the input signal IN. Specifically, the first attenuator 122 attenuates the input signal IN from the touch panel 2, and the decoder 124 decodes the enable signal EN from the attenuated input signal IN. In an exemplary embodiment where a spread spectrum scheme is employed, the despreader 126 despreads the attenuated input signal IN for decoding by the decoder 124. The signal detector 120 controls the power supply circuit 130 to supply the first supply voltage V1 in response to the presence of the enable signal EN.

Figure 11:
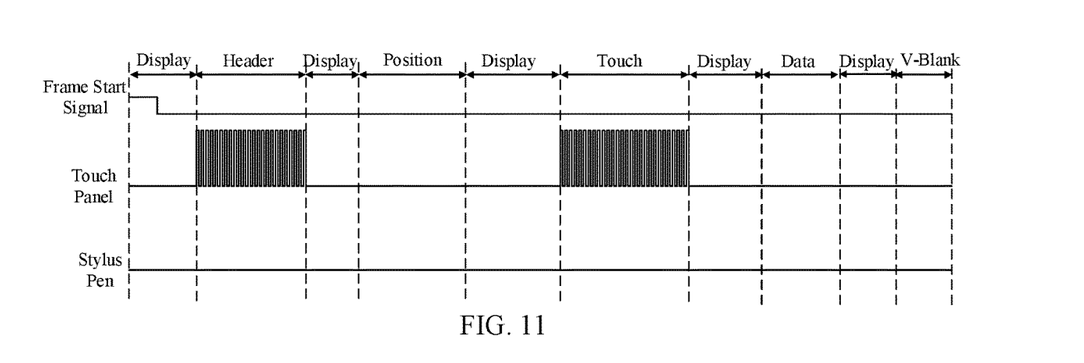
FIG. 11 is a diagram showing an example time sequence in which a touch panel transmits an enable signal to a stylus pen, according to an exemplary embodiment.

FIG. 11 shows an example time sequence in which the touch panel 2 transmits the enable signal EN to the stylus pen 1. Referring to FIG. 11, in this example, the touch panel 2 transmits a signal as the enable signal EN only in a header time slice ("Header") or a touch time slice ("Touch") within a frame period, and does not transmit any signal within other time slices.

Referring back to FIG. 10, at step S130, the drive circuit 110 in the stylus pen 1 generates an output signal P/D.

At step S140, the stylus pen 1 transmits the output signal P/D to the touch panel 2.

At step S150, the touch panel 2 receives the output signal P/D and operates according to the output signal P/D, for example, to display the handwriting at the touch position of the stylus pen 1 on the screen of the touch panel 2.

In step S120, if the signal detector 20 in the stylus pen 1 fails to detect the enable signal EN for a period of time, the signal detector 20 controls the power supply circuit 130 to supply the second supply voltage V2, and the stylus pen 1 enters the non-operating mode.

Figure 12:
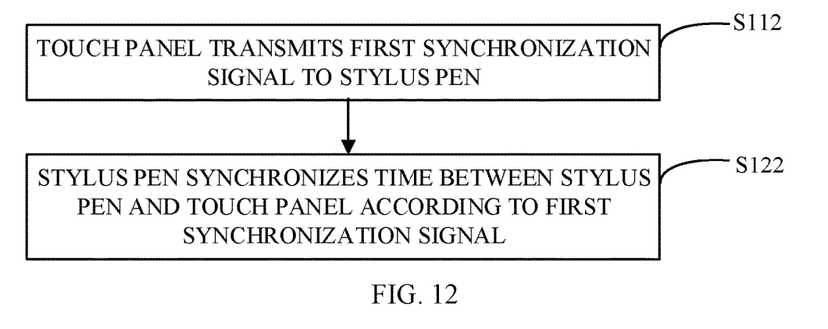
FIG. 12 is a flow chart showing optional steps in the process of FIG. 10.

FIG. 12 illustrates optional steps in the process 100 of FIG. 10. These optional steps can improve the precision of the communication between the stylus pen 1 and the touch panel 2.

At step S112, the touch panel 2 transmits a first synchronization signal SS1 to the stylus pen 1. Step S112 may be performed by the touch panel 2 immediately after the step S110 of FIG. 10 (in which the enable signal EN is transmitted), so that the time is synchronized between the pen 1 and the touch panel 2 before the stylus pen 1 transmits the output signal P/D to the touch panel 2.

At step S122, the signal detector 110 detects the first synchronization signal SS1 from the input signal IN. Specifically, the first attenuator 122 attenuates the input signal IN from the touch panel 2, and the decoder 124 decodes the first synchronization signal SS1 from the attenuated input signal IN. In an exemplary embodiment where a spread spectrum scheme is employed, the despreader 126 despreads the attenuated input signal IN for decoding by the decoder 124. In response to the first synchronization signal SS1, the processor 114 controls the built-in clock circuit 112 to adjust the clock signal to synchronize the time between the stylus pen 1 and the touch panel 2. Step S122 may occur immediately after step 120 of FIG. 10.

Figure 13:
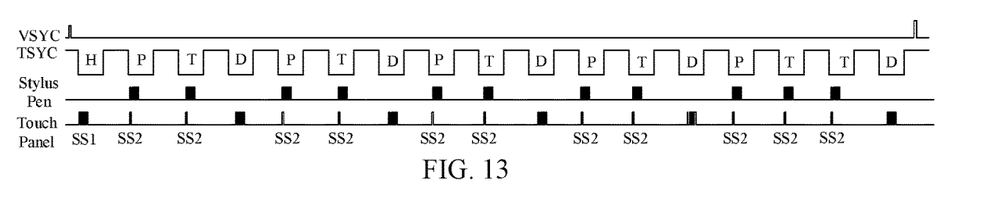
FIG. 13 is a diagram showing an example time sequence in which a stylus pen and a touch panel interact with each other, according to an exemplary embodiment.

FIG. 13 shows an example time sequence in which the stylus pen 1 and the touch panel 2 interact with each other. As shown in FIG. 13, in this example, a frame period includes a time slice ("H") in which the touch panel 2 transmits a header to the stylus pen 1, a time slice ("P") in which the stylus pen 1 transmits a voltage signal to the touch panel 2 for detection of the touch position by the touch panel 2, a time slice ("T") in which the stylus pen 1 transmits touch information (e.g., a pressing force and/or a tilt angle) to the touch panel 2, and a time slice ("D") in which the touch panel 2 performs a display operation. FIG. 13 further shows a second synchronization signal SS2 that is transmitted from the touch panel 2 to the stylus pen 1 at the beginning of each time slice P or T, as will be further described later.

Figure 14:
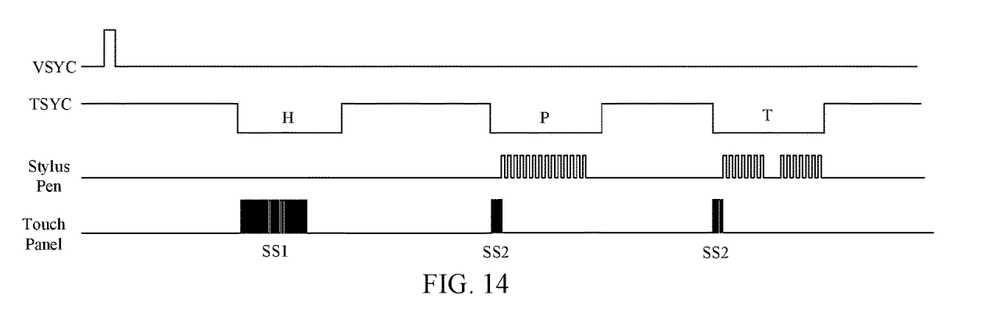
FIG. 14 is a partial enlarged view of the time sequence of FIG. 13.

FIG. 14 shows in an enlarged view a segment of the time sequence of FIG. 13. In the time slice H, the touch panel 2 transmits the first synchronization signal SS1 to the stylus pen 1 so that the time is synchronized between the stylus pen 1 and the touch panel 2 before the time slices P and T.

Figure 15:
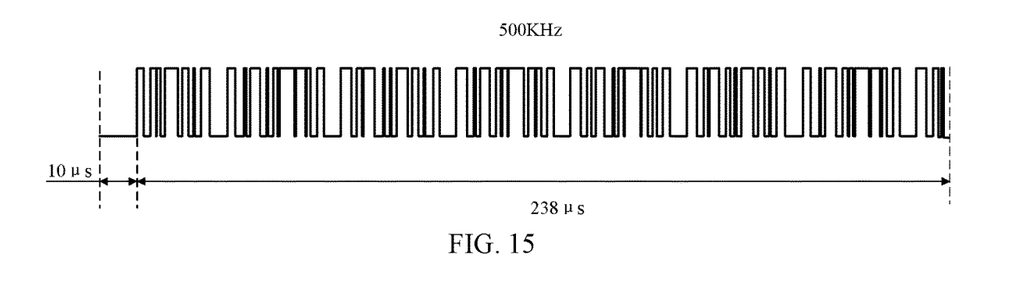
FIG. 15 is an example waveform diagram of a first synchronization signal shown in FIG. 13.

FIG. 15 shows an example waveform of the first synchronization signal SS1. As shown in FIG. 15, the first synchronization signal SS1 is a DSSS signal of 60-bit and 500 kHz. The duration of this signal is 10 µs+238 µs.

Figure 16:
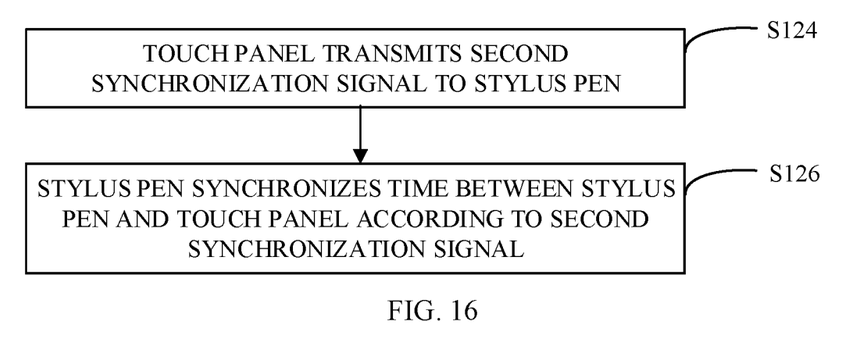
FIG. 16 is a flow chart showing optional steps in the process of FIG. 10.

FIG. 16 shows optional steps in the process 100 of FIG. 10. These optional steps can further improve the precision of the communication between the stylus pen 1 and the touch panel 2.

At step S124, the touch panel 2 transmits the second synchronization signal SS2 to the stylus pen 1. Step S124 may be performed by the touch panel 2 before each time the stylus pen 1 transmits the output signal P/D (for example, at the beginning of each time slice P and T, as shown in FIGS.

13 and 14) so that the time is synchronized again between the stylus pen 1 and the touch panel 2 before the stylus pen 1 transmits the output signal P/D to the touch panel 2.

At step S126, the signal detector 110 detects the second synchronization signal SS2 from the input signal IN. Specifically, the first attenuator 122 attenuates the input signal IN from the touch panel 2, and the decoder 124 decodes the second synchronization signal SS2 from the attenuated input signal IN. In an exemplary embodiment where a spread spectrum scheme is employed, the despreader 126 despreads the attenuated input signal IN for decoding by the decoder 124. In response to the second synchronization signal SS2, the processor 114 controls the built-in clock circuit 112 to adjust the clock signal to resynchronize the time between the stylus pen 1 and the touch panel 2. Step S126 may occur immediately after step 124.

Figure 17:
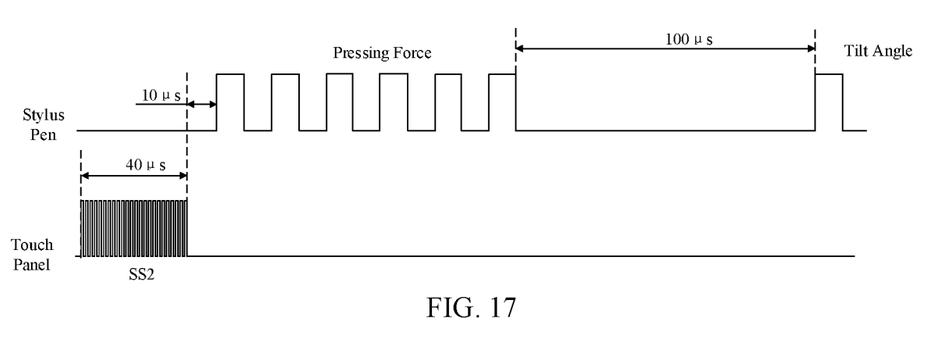
FIG. 17 is an example waveform diagram of signals in time slice T shown in FIG. 14.

FIG. 17 shows an example waveform of signals in the time slice T of FIG. 14. As shown in FIG. 17, in this example, the second synchronization signal SS2 is a DSSS signal of 10-bit and 500 kHz. The duration of the second synchronization signal SS2 is 40 µs. Further, the data indicative of the pressing force of the pen tip and the tilt angle of the stylus pen is a signal of 100 kHz, and there is a time interval of 100 µs between the data indicative of the pressing force of the pen tip and the data indicative of the tilt angle of the stylus pen.

It will be understood that the waveform shown in FIG. 17 are exemplary. In other exemplary embodiments, the stylus pen 1 may further transmit data indicative of other information (e.g., a user selection of a key on the stylus pen 1) to the touch panel 2 within the time slice T.

By the touch panel 2 transmitting the first synchronization signal SS1 and the second synchronization signal SS2 to the stylus pen 1, the time is synchronized between the stylus pen 1 and the touch panel 2, so that the stylus pen 1 can achieve accurate data transmission to the touch panel 2 even without using an external clock circuit. This advantageously provides an option for reducing the cost of the stylus pen 1.

The foregoing are merely specific embodiments of the present disclosure, but the protection scope of the present disclosure is not limited thereto. Variations or alternatives readily conceivable by a person having ordinary skill in the art fall within the scope of the present disclosure. Thus, the scope of the disclosure should be determined by the appended claims.

What is claimed is:

1. A stylus pen, comprising:
   a tip electrode configured to be in contact with a screen of a touch panel to transmit an output signal to the touch panel via the tip electrode and receive an input signal from the touch panel via the tip electrode;
   a power supply circuit configured to selectively supply a first supply voltage or a second supply voltage;
   a signal detector configured to detect an enable signal from the input signal, wherein the signal detector is further configured to control the power supply circuit to supply the first supply voltage in response to presence of the enable signal, and to control the power supply circuit to supply the second supply voltage in response to absence of the enable signal for a period of time; and
   a drive circuit configured to operate at the first supply voltage to generate the output signal and not to generate the output signal at the second supply voltage,
   wherein the signal detector comprises:
      a first attenuator configured to actively attenuate the input signal from the touch panel, and
      a decoder configured to decode the enable signal from the input signal attenuated by the first attenuator,
      wherein the decoder is further configured to decode a synchronization signal from the input signal attenuated by the first attenuator, and
   wherein the drive circuit comprises a microcontroller comprising:
      a built-in clock circuit configured to generate a clock signal, wherein the built-in clock circuit comprises an RC oscillator, a counter, and a holding register, and
      a processor configured to control the built-in clock circuit based on the synchronization signal to adjust the clock signal to synchronize time between the stylus pen and the touch panel, and to generate the output signal based on the adjusted clock signal.

2. The stylus pen of claim 1, wherein the drive circuit further comprises an amplifier configured to amplify the output signal such that the output signal amplified by the amplifier is transmitted via the tip electrode.

3. The stylus pen of claim 1, wherein the input signal from the touch panel comprises a spread spectrum signal, and wherein the signal detector further comprises a despreader configured to despread the input signal attenuated by the first attenuator for decoding by the decoder.

4. The stylus pen of claim 1, further comprising at least one of a pressure sensor or an angle sensor, wherein the pressure sensor is configured to detect a pressing force of the tip electrode being pressed on the screen of the touch panel, wherein the angle sensor is configured to detect a tilt angle of the stylus pen relative to the screen of the touch panel, and wherein the drive circuit is further configured to generate the output signal based on at least one of the pressing force or the tilt angle.

5. A touch panel for use with a stylus pen, comprising:
   a plurality of touch sensors throughout a display area of the touch panel; and
   a touch driver configured to detect an output signal from the stylus pen via the plurality of touch sensors and transmit an input signal to the stylus pen via the plurality of touch sensors,
   wherein the input signal comprises an enable signal that enables the stylus pen to generate the output signal,
   wherein the touch driver comprises:
      a second attenuator configured to actively attenuate the output signal from the stylus pen,
      a signal codec configured to decode the output signal attenuated by the second attenuator, and
      a touch signal processor configured to generate the input signal and process the output signal decoded by the signal codec to detect a touch event by the stylus pen,
      wherein the signal codec is further configured to encode the input signal generated by the touch signal processor such that the input signal encoded by the signal codec is transmitted via the plurality of touch sensors,
   wherein the touch panel further comprises a plurality of driving electrode strips extending in a first direction and a plurality of sensing electrode strips extending in a second direction crossing the first direction, and the respective intersections of the driving electrode strips and the sensing electrode strips form respective touch sensors.

6. A touch sensing system, comprising:
   a stylus pen comprising:

a tip electrode configured to be in contact with a screen of a touch panel to transmit an output signal to the touch panel via the tip electrode and receive an input signal from the touch panel via the tip electrode;

a power supply circuit configured to selectively supply a first supply voltage or a second supply voltage;

a signal detector configured to detect an enable signal from the input signal, wherein the signal detector is further configured to control the power supply circuit to supply the first supply voltage in response to presence of the enable signal, and to control the power supply circuit to supply the second supply voltage in response to absence of the enable signal for a period of time; and a drive circuit configured to operate at the first supply voltage to generate the output signal and not to generate the output signal at the second supply voltage; and a touch panel comprising:

a plurality of touch sensors throughout a display area of the touch panel; and a touch driver configured to detect the output signal from the stylus pen via the plurality of touch sensors and transmit the input signal to the stylus pen via the plurality of touch sensors, wherein the signal detector comprises:

a first attenuator configured to actively attenuate the input signal from the touch panel, and a decoder configured to decode the enable signal from the input signal attenuated by the first attenuator, wherein the decoder is further configured to decode a synchronization signal from the input signal attenuated by the first attenuator, and wherein the drive circuit comprises a microcontroller comprising:

a built-in clock circuit configured to generate a clock signal, wherein the built-in clock circuit comprises an RC oscillator, a counter, and a holding register, and a processor configured to control the built-in clock circuit based on the synchronization signal to adjust the clock signal to synchronize time between the stylus pen and the touch panel, and to generate the output signal based on the adjusted clock signal.

7. The touch sensing system of claim 6, wherein the drive circuit further comprises an amplifier configured to amplify the output signal such that the output signal amplified by the amplifier is transmitted via the tip electrode.

8. The touch sensing system of claim 6, wherein the input signal from the touch panel comprises a spread spectrum signal, and wherein the signal detector further comprises a despreader configured to despread the input signal attenuated by the first attenuator for decoding by the decoder.

9. The touch sensing system of claim 6, wherein the stylus pen further comprises at least one of a pressure sensor or an angle sensor, wherein the pressure sensor is configured to detect a pressing force of the tip electrode being pressed on the screen of the touch panel, wherein the angle sensor is configured to detect a tilt angle of the stylus pen relative to the screen of the touch panel, and wherein the drive circuit is further configured to generate the output signal based on at least one of the pressing force or the tilt angle.

10. A method of operating the touch sensing system of claim 6, the method comprising:

transmitting, by the touch panel, the input signal to the stylus pen;

detecting, by the signal detector, the enable signal from the input signal;

responsive to presence of the enable signal, controlling, by the signal detector, the power supply circuit to supply the first supply voltage; and responsive to absence of the enable signal for a period of time, controlling, by the signal detector, the power supply circuit to supply the second supply voltage.

11. The method of claim 10, wherein the drive circuit comprises a microcontroller comprising: a built-in clock circuit configured to generate a clock signal, and a processor, and wherein the transmitting the input signal comprises transmitting the enable signal, the method further comprising:

transmitting, by the touch panel, a first synchronization signal to the stylus pen immediately after transmitting the enable signal;

detecting, by the signal detector, the first synchronization signal from the input signal; and responsive to the first synchronization signal, controlling, by the processor, the built-in clock circuit to adjust the clock signal to synchronize time between the stylus pen and the touch panel.

12. The method of claim 11, further comprising, after the transmitting by the touch panel the first synchronization signal, and each time before the stylus pen transmits the output signal:

transmitting, by the touch panel, a second synchronization signal to the stylus pen;

detecting, by the signal detector, the second synchronization signal from the input signal; and responsive to the second synchronization signal, controlling, by the processor, the built-in clock circuit to adjust the clock signal to synchronize time between the stylus pen and the touch panel.

13. The method of claim 12, wherein the signal detector comprises a first attenuator and a decoder, and the detecting, by the signal detector, the enable signal, the first synchronization signal, or the second synchronization signal from the input signal comprises:

attenuating, by the first attenuator, the input signal from the touch panel, and decoding, by the decoder, the enable signal, the first synchronization signal, or the second synchronization signal from the input signal attenuated by the first attenuator.

14. The method of claim 13, wherein the touch driver comprises a signal codec and a touch signal processor, the method further comprising:

generating, by the touch signal processor, the input signal, and encoding, by the signal codec, the input signal generated by the touch signal processor such that the encoded input signal is transmitted via the plurality of touch sensors.

15. The method of claim 14, wherein the encoding the input signal generated by the touch signal processor comprises encoding the input signal into a spread spectrum signal, and wherein the signal detector further comprises a despreader, the method further comprising:

despreading, by the despreader, the attenuated input signal for decoding by the decoder.

* * * * *